United States Patent
Meyer Rojas et al.

(10) Patent No.: US 11,880,651 B2
(45) Date of Patent: Jan. 23, 2024

(54) ARTIFICIAL INTELLIGENCE BASED CLASSIFICATION FOR TASTE AND SMELL FROM NATURAL LANGUAGE DESCRIPTIONS

(71) Applicant: International Business Machines Corporation, Armonk, NY (US)

(72) Inventors: Pablo Meyer Rojas, Brooklyn, NY (US); Guillermo Cecchi, New York, NY (US); Elif Eyigoz, Lake Peekskill, NY (US); Raquel Norel, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 17/304,626

(22) Filed: Jun. 23, 2021

(65) Prior Publication Data
US 2022/0414327 A1    Dec. 29, 2022

(51) Int. Cl.
*G06F 40/20*   (2020.01)
*G06V 10/46*   (2022.01)
*G06F 18/2431* (2023.01)

(52) U.S. Cl.
CPC .......... *G06F 40/20* (2020.01); *G06F 18/2431* (2023.01); *G06V 10/464* (2022.01)

(58) Field of Classification Search
USPC ...................................... 704/1–504
See application file for complete search history.

(56) References Cited

U.S. PATENT DOCUMENTS 11,728,012 B2 *  8/2023  Pappas ................... G16C 20/70
                                            702/30
2008/0086300 A1 * 4/2008  Anismovich ........... G06F 40/56
                                            704/8

(Continued)

FOREIGN PATENT DOCUMENTS

CN         210211779 U       3/2020

OTHER PUBLICATIONS

"Moses", Statistical Machine Translation System, Page last modified on Jun. 24, 2018, 2 pages, <http://www.statmt.org/moses/>.

(Continued)

*Primary Examiner* — Marcus T Riley
(74) *Attorney, Agent, or Firm* — Michael A. Petrocelli

(57) ABSTRACT

Taste and smell classification from multilanguage descriptions can be performed by extracting, by one or more processors using natural language processing, a text including one or more words associated with taste and smell perceptions from an input received from a plurality of users. The input includes multilanguage information regarding at least one of changes in smell and changes in taste perceived by each of the plurality of users. Feature vectors are generated for the text extracted from the input using global vectors, and a distance between the feature vectors and a plurality of reference descriptors associated with taste and smell is calculated for determining a similarity between the text and the reference descriptors and creating a training dataset based on which a classification model is generated for categorizing the plurality of users according to the at least one of changes in smell and changes in taste.

20 Claims, 6 Drawing Sheets

(56) References Cited

U.S. PATENT DOCUMENTS

| | | | | |
|---|---|---|---|---|
| 2014/0012794 | A1* | 1/2014 | Dillon | G06N 5/02 |
| | | | | 706/46 |
| 2019/0156224 | A1* | 5/2019 | Cecchi | G16C 20/64 |
| 2020/0348314 | A1* | 11/2020 | Henkin | A61K 31/522 |
| 2020/0364536 | A1* | 11/2020 | Meyer Rojas | G06N 3/04 |
| 2020/0373018 | A1* | 11/2020 | Segal | G16H 50/70 |
| 2022/0414327 | A1* | 12/2022 | Meyer Rojas | G06F 40/30 |

OTHER PUBLICATIONS

"The Annotated Transformer", harvardnlp, Apr. 3, 2018, 46 pages, <https://nlp.seas.harvard.edu/2018/04/03/attention.html>.

Gozen, et al., "Evaluation of Olfactory Function With Objective Tests in COVID-19-Positive Patients: A Cross-Sectional Study", Ear, Nose & Throat Journal, © 2020, 5 pages, <https://journals.sagepub.com/doi/pdf/10.1177/0145561320975510>.

Jarvis, Brooke, "What Can Covid-19 Teach US About the Mysteries of Smell?", The New York Times, Updated Jan. 31, 2021, 14 pages, <https://www.nytimes.com/2021/01/28/magazine/covid-smell-science.html>.

Mell, et al., "The NIST Definition of Cloud Computing", National Institute of Standards and Technology, Special Publication 800-145, Sep. 2011, 7 pages.

* cited by examiner

ARTIFICIAL INTELLIGENCE BASED CLASSIFICATION FOR TASTE AND SMELL FROM NATURAL LANGUAGE DESCRIPTIONS

BACKGROUND

The present invention generally relates to the field of artificial intelligence for healthcare, and more particularly to a taste and smell classifier.

The most common taste and smell disorders include anosmia (loss of sense of smell), ageusia (loss of sense of taste), hyposmia (reduced ability to smell), and hypogeusia (reduced ability to taste sweet, sour, bitter, or salty things). In other disorders, odors, tastes, or flavors may be misread or distorted. They may cause a person to detect a bad odor or taste from something that is normally pleasant to taste or smell. Taste and smell disorders can affect quality of life, and may also be a sign of underlying disease.

For instance, taste and smell problems can be associated with certain health conditions including allergies, sinus infection, viral infections, obesity, diabetes, high blood pressure, poor nutrition, and nervous system diseases, such as Parkinson's disease, Alzheimer's disease and multiple sclerosis.

Changes in taste and smell are typically assessed using standardized self-report measures of relevant subjective states repeatedly throughout a smell/taste experience. While such approaches provide valuable information, the sensitivity of standardized scales can be limited by the mood descriptors used, which may ignore the effect of a wide range of odors and flavors. Moreover, self-report scales rely on access to interoceptive experiences and the motivation and capacity of an individual to accurately report them, both of which can vary systematically with the type of odor or flavor.

SUMMARY

Shortcomings of the prior art are overcome and additional advantages are provided through the provision of a computer-implemented method for classifying taste and smell. The method includes receiving, by one or more processors, an input from a plurality of users, the input including information regarding at least one of changes in smell and changes in taste perceived by each of the plurality of users, the input being received from the plurality of users in one or more languages, using natural language processing, extracting a text including one or more words from the input, the text being associated with taste and smell perceptions, generating feature vectors for the text extracted from the input using global vectors, calculate a distance between the feature vectors and a plurality of reference descriptors associated with taste and smell for determining a similarity between the text extracted from the input and the reference descriptors and generating a training dataset based on which a classification model is generated for categorizing the plurality of users according to the at least one of changes in smell and changes in taste.

Another embodiment of the present disclosure provides a computer program product for classifying taste and smell, based on the method described above.

Another embodiment of the present disclosure provides a computer system for classifying taste and smell, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
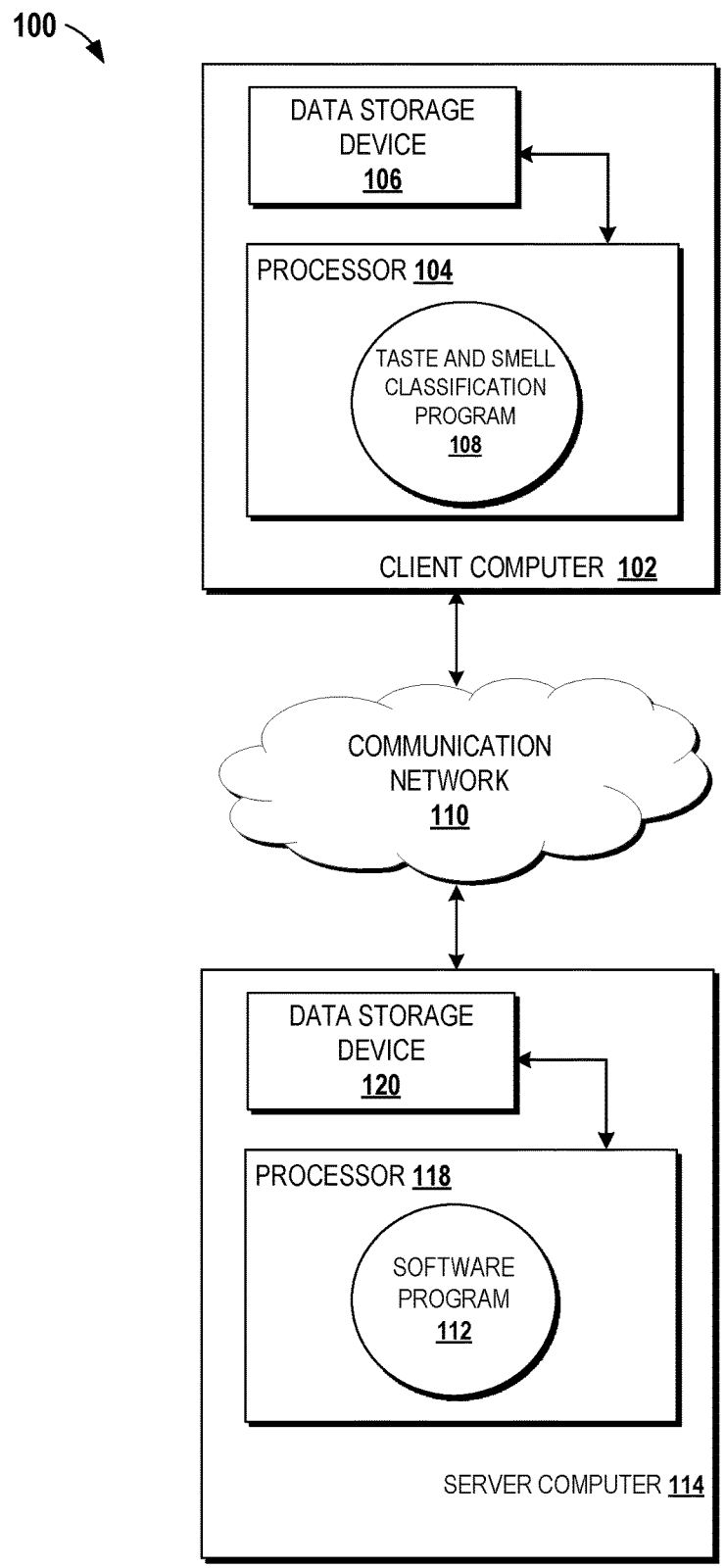
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Rapid developments in computerized natural language processing (NLP) provide sophisticated automated methods to quantitatively characterize text and understand mental states based on extracted features. NLP methods are routinely used for the purpose of speech recognition, chatbots and conversation agents, recommender systems, and the like.

A person's mental state plays an important role in taste and olfaction (smell) determination. Typically, changes in taste and/or smell are assessed using standardized self-report measures of relevant subjective states repeatedly throughout a taste/smell test. While these approaches can provide valuable information, the sensitivity of standardized scales is limited by the mood descriptors using during the test, which may not capture the effects of additional flavors/odors. As mentioned above, self-report scales rely on access to interoceptive experiences, as well as the motivation and capacity to accurately report them, both factors may vary systematically according to the impact of a certain type of odor or flavor. Computerized analysis of free speech, text and videos offers the potential to get around some of these limitations, providing a more direct window into the olfactory/flavory mind, thereby allowing to classify respondents to a survey or questionnaire according to their (written or spoken) descriptions of smell and taste perceptions.

Embodiments of the present disclosure use natural language processing tools to parse an input (e.g., text, speech/voice, or video) received from a group of individuals in response to a plurality of questions relative to a smell and/or taste perception in any language, and classify the individuals according to their answers. Specifically, the natural language processing tools parse or transform the descriptions of odorants and flavors into embeddings that can then be used to train an algorithm to classify the group of individuals into sub-groups. Embeddings and analysis can be performed on a word by word bag-of-words approach or using full sentences. An advantage of the natural language processing models is that they can be implemented independently of the language spoken by the individuals, as semantic embeddings are available for most languages or models can be trained if a sufficient corpus is available.

Therefore, embodiments of the present invention provide a method, system, and computer program product for generating a taste and smell classifier from multi-language descriptors based on which different health conditions can be identified. The following described exemplary embodiments provide a system, method, and computer program product to, among other things, parsing a text extracted from an input received from one or more individuals responsive to questions associated with at least one of a smell perception and a taste perception using natural language processing techniques, associating each of the smell perception and the taste perception with a plurality of reference descriptors, and embedding the descriptors for training a classification algorithm to categorize the one or more individuals according to the smell perception and the taste perception.

Thus, the present embodiments have the capacity to improve the technical field of artificial intelligence for healthcare by providing a taste and smell classification method from multi-language descriptions that may help identifying health conditions associated with taste and smell disorders such as viral infections (e.g., influenza, Coronavirus disease, etc.) and nervous system diseases (e.g., Parkinson's disease, Alzheimer's disease, etc.). Specifically, the proposed taste and smell classifier provides a predictive olfactory and taste model that allows establishing associations between changes in olfaction and/or taste and certain diseases based on the fact that individuals with a particular disease may use very different words to talk about smell and taste perceptions than those without it.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a taste and smell classification program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server, an IoT device, or any other electronic device capable of receiving and sending data via the communication network 110. In another embodiment, server computer 114 may represent a server computing system utilizing multiple computers as a server system, such as in a cloud computing environment.

The taste and smell classification program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
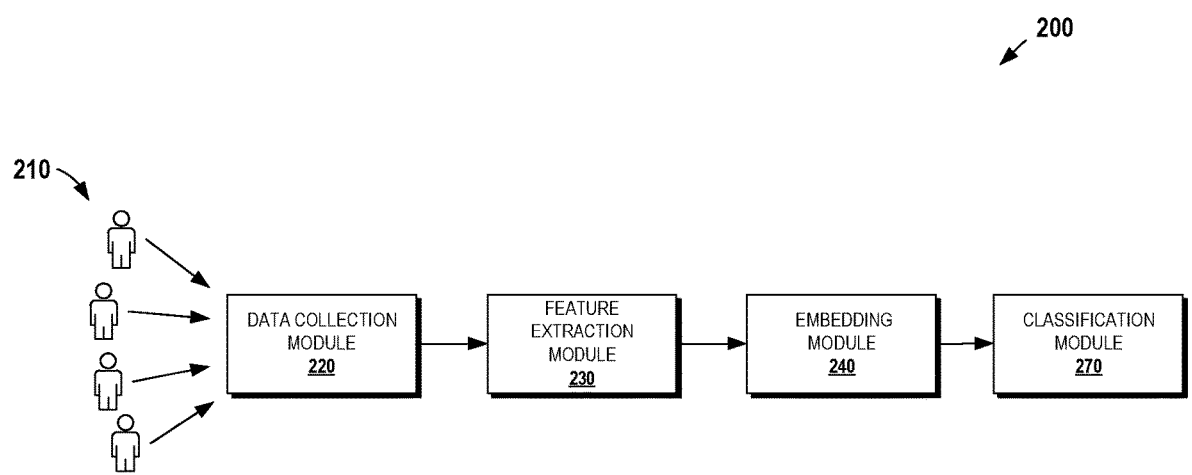
FIG. 2 depicts a computer system for classifying taste and smell, according to an embodiment of the present disclosure.

Referring now to FIG. 2, components of a computer system 200 for classifying taste and smell are shown, according to an embodiment of the present disclosure. In this embodiment, a data collection module 220 receives data from a plurality of users 210. Each user in the plurality of users 210 is presented with one or more questions regarding changes in taste and/or smell. In an embodiment, the computer system 200 presents or poses the one or more questions to one or more users in the plurality of users 210. Exemplary questions presented to the plurality of users 210 may include "what changes in smell have you perceived?", "what changes in taste have you perceived"?, among other questions regarding changes in taste and smell.

The one or more questions may be presented to the plurality of users 210 in the form of a questionnaire. In another embodiment, the plurality of users 210 can provide a written, spoken, or video input to the computer system 200 including a description of a current smell and/or taste perception. In yet another embodiment, the computer system 200 may extract olfaction and taste-related data (i.e., text) from available multimodal data (e.g., text, voice, videos, etc.) associated with the plurality of users 210.

It should be noted that data collection is done with user consent via, for example, an opt-in and opt-out feature. Additionally, user(s) can choose to stop having his/her information being collected or used. In some embodiments, user(s) can be notified each time data is being collected. The collected data is envisioned to be secured and not shared with anyone without previous consent.

Data corresponding to the smell and taste descriptions (i.e., answers) provided by the plurality of users 210 is collected by the data collection module 220 and analyzed by the feature extraction module 230. Specifically, the input provided by the plurality of users 210 responding to the one or more questions includes descriptive language associated with a smell and/or taste perception, such descriptive language is analyzed and processed in the feature extraction module 230 using natural language processing (NLP) tools. The feature extraction module 230, using the NLP tools, parses the descriptions of odorants and smells provided by the plurality of users 210. In some embodiments, the feature extraction module 230 parses text extracted from multimodal input data including voice and video recordings received from the plurality of users 210. These descriptions are then transformed into embeddings in the embedding module 240.

According to an embodiment, the analysis and embeddings steps can be performed using a word by word bag-of-words approach or using full sentences. It should be noted that, the NLP models used in the feature extraction module 230 can be implemented independently of the language spoken by the plurality of users 210. Specifically, since semantic embeddings are available for most languages, the plurality of users 210 may provide a response to the one or more questions in any language. Alternatively, NLP models can be trained to recognize multiple languages if a sufficient corpus is available.

With continued reference to FIG. 2, the bag-of-words approach includes a classification based on the nature of individual words appearing in the responses provided by the plurality of users 210 to the one or more questions, without reference to the order or context of each individual word. Various machine learning approaches can be used to classify speech based on the frequency of word occurrence within the responses to the one or more questions. This may allow identifying the most important words contributing to the classification of speech related to changes in olfaction and taste perceptions. Words contributing to the classification may include, for example, words with social content (given the social role of olfaction), as well as emotionally positive words (e.g., good smell) and emotionally negative words (e.g., bad smell). This categorization can help understanding the effects of changes in olfaction and taste.

Specifically, the feature extraction and embedding modules 230, 240 classify the responses to the one or more questions or input(s) provided by the plurality of users 210 using the following assumptions: (i) each health condition has a unique signature in speech, spanning different domains such as sentence formulation and content; (ii) the higher the reported loss or change in olfaction and/or taste, the greater the associated changes in speech; (iii) users may communicate sensations more easily when using open ended descriptions; and (iv) trained models may generalize well in independent patient datasets.

According to an embodiment, the feature extraction module 230 use reference descriptors to classify each input provided by the plurality of users 210 responsive to the one or more questions. The reference descriptors include words typically used to describe taste and smell. For example, reference descriptors associated with perceived smells may include bakery, sweet, fruit, fish, garlic, spices, cold, sour, burnt, acid, warm, musky, sweaty, urine, decayed, wood, grass, flower, and chemical; while reference descriptors associated with perceived taste may include salty, sour, sweet, bitter, and savory.

However, smell and taste reference descriptors may extend beyond those mentioned above. For instance, the following list of 146 smell descriptors have been suggested by smell specialists: fruity citrus, lemon, grapefruit, orange, fruity other than citrus pineapple, grape juice, strawberry, apple, pear, cantaloupe, peach, banana, floral, rose, violets, lavender, cologne, musk, perfumery, fragrant, aromatic, honey, cherry (berry), almond, nail polish remover, nutty (walnuts, etc.), spicy, clove, cinnamon, laurel leaves, tea leaves, seasoning (for meat), black pepper, green pepper, dill, caraway, oak wood cognac, woody resinous, cedarwood, mothballs, minty peppermint, camphor, eucalyptus, chocolate, vanilla, sweet, maple syrup, caramel, malty, raisins, molasses, coconut, anise (licorice), alcoholic, etherish, anesthetic, cleaning fluid, gasoline solvent, turpentine (pine oil), geranium leaves, celery, fresh green vegetables, crushed weeds, crushed grass, herbal green cut grass, raw cucumber, hay, grainy (as grain), yeasty, bakery (fresh bread), sour milk, fermented (rotten) fruit, beery, soapy, leather, cardboard, rope, wet paper, wet wool wet dog, dirty linen, stale, musty earthy moldy, raw potato, mouse, mushroom, peanut butter, beany, eggy (fresh eggs), bark birch bark, cork, burnt smoky, fresh tobacco smoke, incense, coffee, stale tobacco smoke, burnt paper, burnt milk, burnt rubber, tar, creosote, disinfectant, carbolic, medicinal, chemical, bitter, sharp, pungent, acid, sour, vinegar, sauerkraut, ammonia, urine, fishy, kippery (smoked fish), seminal sperm, new rubber, sooty, burnt candle, kerosene, oily fatty, buttery fresh butter, paint, varnish, popcorn, fried chicken, meaty (cooked good), soupy, cooked vegetables, rancid, sweaty, cheesy, household gas, sulfidic, garlic onion, metallic, blood raw meat, animal, sewer, putrid foul decayed, fecal, cadaverous, sickening, dry powdery, chalky, light, heavy, cool cooling, warm.

The feature extraction module 230, based on the reference descriptors, extract a text including a set of words from the received input that can be associated with changes in taste and smell. The extracted text can be transformed to a vector space using, for example, models for distributed word representation such as Global Vectors (GloVe) that establishes rules and relationships between words in the extracted text. Accordingly, operations can be performed between word vectors. For example, a distance between words vectors can be calculate to determine how close words are related (e.g., lemon and acid). In one example, the distance is generally the cosine similarity, but other distances can be implemented in order to find the one that best differentiates the subject populations. Such distances may include a Minkowski distance, a Manhattan distance, an Euclidean distance, a Hamming distance, a Cosine distance, etc. This provides a way of quantifying a distance and defining a "similarity" between the set of words extracted from each user input and the reference descriptors that can be used to classify the plurality of users 210.

In one example, for each user in the plurality of users 210 the feature extraction module 230 calculates the distance between each word extracted from the input provided by the user and each of the reference descriptors, for example, a distance between the word "pepper" and the reference descriptor "spices". Since there can be many words in the description provided by the plurality of users 210 regarding taste and smell perceptions, the feature extraction module 230 calculates a distribution of distances encompassing all the extracted words and uses a summarizing parameter to establish the relationships between different subject populations (i.e., the plurality of users 210). In an embodiment, the summarizing parameter may include, for example, a mean/median or Maximum/Minimum. In another embodiment, the summarizing parameter may include, for example, non-parametric measures such as a Kolmogorov-Smirnov distribution.

According to another embodiment, the bag-of-words approach described above can be extended to whole sentences, paragraphs, and multiple paragraphs by embedding the descriptions of taste and smell provided by the plurality of users 210 and comparing them to a set of reference embedded sentences, paragraphs, and multiple paragraphs. The reference sentences, paragraphs, and multiple paragraphs can be, for example, extracted from books or websites describing the smell/taste of food, produce, perfumes, etc.

In some embodiments, extension to other languages can be performed via translation of reference sentences. For words, a translation of the reference descriptors can be performed as the closest translated word or as a combination of embedded vectors when there are more than one word for the translation. In such embodiments, models for distributed word representation such GloVe can be used for any language. For sentences, statistical machine translation systems such as Moses phrase-based translation or Transformer can be used to translate user responses to other languages.

Then, embedded reference(s) and analyzed sentences, paragraphs, and multiple paragraphs can be applied in the new language (learned embeddings to convert input tokens and output tokens to vectors of the same dimension).

The embedded smell and taste descriptions are used in the classification module 270 to train an algorithm to classify the plurality of users 210 into sub-groups according to the embedded smell/taste descriptions. Stated differently, machine learning (ML) classification algorithms are used by the classification module 270 to categorize the plurality of users 210 based on the embedded smell and taste descriptors.

As known by those skilled in the art, machine learning is a form of artificial intelligence (AI) that enables a system to learn from data rather than through explicit programming. As the algorithms ingest training data, it is then possible to produce more precise models based on that data. A machine-learning model is the output generated when a machine-learning algorithm is trained with data. After training, the model is provided with an input and an output will be given to user(s). For example, a predictive algorithm will create a predictive model. Then, when users provide the predictive model with data, they will receive a prediction based on the data that trained the model, in this example, the taste and smell descriptions provided by the plurality of users 210. Exemplary ML models used in the classification module 270 may include any statistical, classical machine learning models including random forest, gradient boosting, SVM, etc., or deep learning models.

Figure 3:
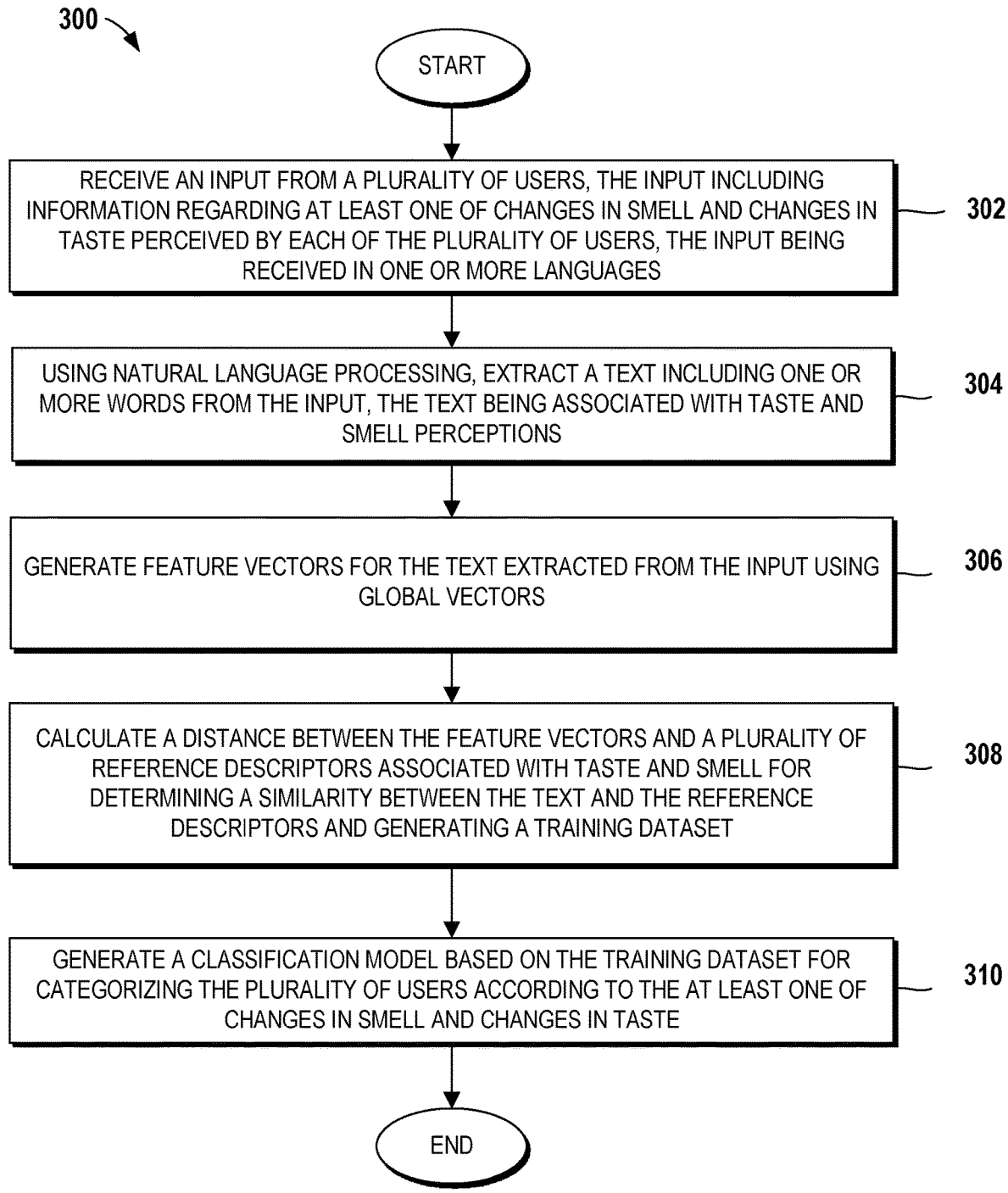
FIG. 3 depicts a flowchart illustrating the steps of a computer-implemented method for classifying taste and smell, according to an embodiment of the present disclosure.

Referring now to FIG. 3, a flowchart 300 illustrating the steps of a computer-implemented method for classifying taste and smell is shown, according to an embodiment of the present disclosure.

The process starts at step 302 in which an input from a plurality of users is received by a computer, such as the client computer 102 in FIG. 1. The received input includes information regarding at least one of changes in smell and changes in taste perceived by each of the plurality of users. It should be noted that the plurality of users can provide the input in different languages (e.g., English, Spanish, German, etc.).

According to an embodiment, the input from the plurality of users is received in response to one or more questions presented to the plurality of users, the one or more questions include, for example, at least one of what changes in smell have you perceived and what changes in taste have you perceived. The input received from the plurality of users may include multimodal input data such as text, voice, and/or video.

At step 304, a text including one or more words is extracted by the computer from the received input using natural language processing techniques, the text is associated with taste and smell perceptions. In an embodiment, extracting the text from the received input is performed using a bag-of-words approach. As described above, the bag-of-words approach includes a classification based on the nature of individual words appearing in the input provided by the plurality of users, without reference to the order or context of each individual word.

In some embodiments, the bag-of-words approach can be extended to whole sentences by comparing the one or more words in the text extracted from the input to a set of reference sentences, paragraphs, and multiple paragraphs.

At step 306, feature vectors are generated by the computer for the text extracted from the input using global vectors.

At step 308, a distance between the feature vectors and a plurality of reference descriptors associated with taste and smell is calculated by the computer for determining a similarity between the text extracted from the input and the reference descriptors and generating a training dataset. The plurality of reference descriptors includes words typically used to describe taste and smell. As described above, since many words can be extracted from the input received from the plurality of users regarding taste and smell perceptions, a distribution of distances encompassing all the extracted words is calculated, and a summarizing parameter is used to establish the relationships between the plurality of users.

In an embodiment, reference descriptors in the plurality of reference descriptors associated with smell may include bakery, sweet, fruit, fish, garlic, spices, cold, sour, burnt, acid, warm, musky, sweaty, urine, decayed, wood, grass, flower, and chemical. However, these reference descriptors can be expanded to a more detailed list of smell descriptors compiled by smell specialists that includes the following words: fruity citrus, lemon, grapefruit, orange, fruity other than citrus pineapple, grape juice, strawberry, apple, pear, cantaloupe, peach, banana, floral, rose, violets, lavender, cologne, musk, perfumery, fragrant, aromatic, honey, cherry (berry), almond, nail polish remover, nutty (walnuts, etc.), spicy, clove, cinnamon, laurel leaves, tea leaves, seasoning (for meat), black pepper, green pepper, dill, caraway, oak wood cognac, woody resinous, cedarwood, mothballs, minty peppermint, camphor, eucalyptus, chocolate, vanilla, sweet, maple syrup, caramel, malty, raisins, molasses, coconut, anise (licorice), alcoholic, etherish, anesthetic, cleaning fluid, gasoline solvent, turpentine (pine oil), geranium leaves, celery, fresh green vegetables, crushed weeds, crushed grass, herbal green cut grass, raw cucumber, hay, grainy (as grain), yeasty, bakery (fresh bread), sour milk, fermented (rotten) fruit, beery, soapy, leather, cardboard, rope, wet paper, wet wool wet dog, dirty linen, stale, musty earthy moldy, raw potato, mouse, mushroom, peanut butter, beany, eggy (fresh eggs), bark birch bark, cork, burnt smoky, fresh tobacco smoke, incense, coffee, stale tobacco smoke, burnt paper, burnt milk, burnt rubber, tar, creosote, disinfectant, carbolic, medicinal, chemical, bitter, sharp, pungent, acid, sour, vinegar, sauerkraut, ammonia, urine, fishy, kippery (smoked fish), seminal sperm, new rubber, sooty, burnt candle, kerosene, oily fatty, buttery fresh butter, paint, varnish, popcorn, fried chicken, meaty (cooked good), soupy, cooked vegetables, rancid, sweaty, cheesy, household gas, sulfidic, garlic onion, metallic, blood raw meat, animal, sewer, putrid foul decayed, fecal, cadaverous, sickening, dry powdery, chalky, light, heavy, cool cooling, warm.

Similarly, reference descriptors in the plurality of reference descriptors associated with taste may include salty, sour, sweet, bitter, and savory.

Finally, at step 310, a classification model based on the training dataset is generated by the computer for categorizing the plurality of users according to the at least one of changes in smell and changes in taste. Based on the categorization of the plurality of users, the changes in taste and smell can be associated with one or more health conditions including viral infections and neurological/nervous system disorders.

Therefore, embodiments of the present disclosure provide a method, system and computer program product to, among other things, quantify changes in smell and taste based on multilingual descriptions of smell and taste sensations provided by a plurality of individuals in response to questions presented in a survey or spontaneously provided by the individuals using text, speech, and video inputs. Based on the quantification of changes in smell and taste, the proposed embodiments may allow identifying health conditions associated with olfaction and taste disorders. Specifically, by implementing the proposed embodiments, a predictive olfactory and taste map can be generated to study the link between changes in olfaction and/or taste and diseases to which those changes may be connected.

Figure 4:
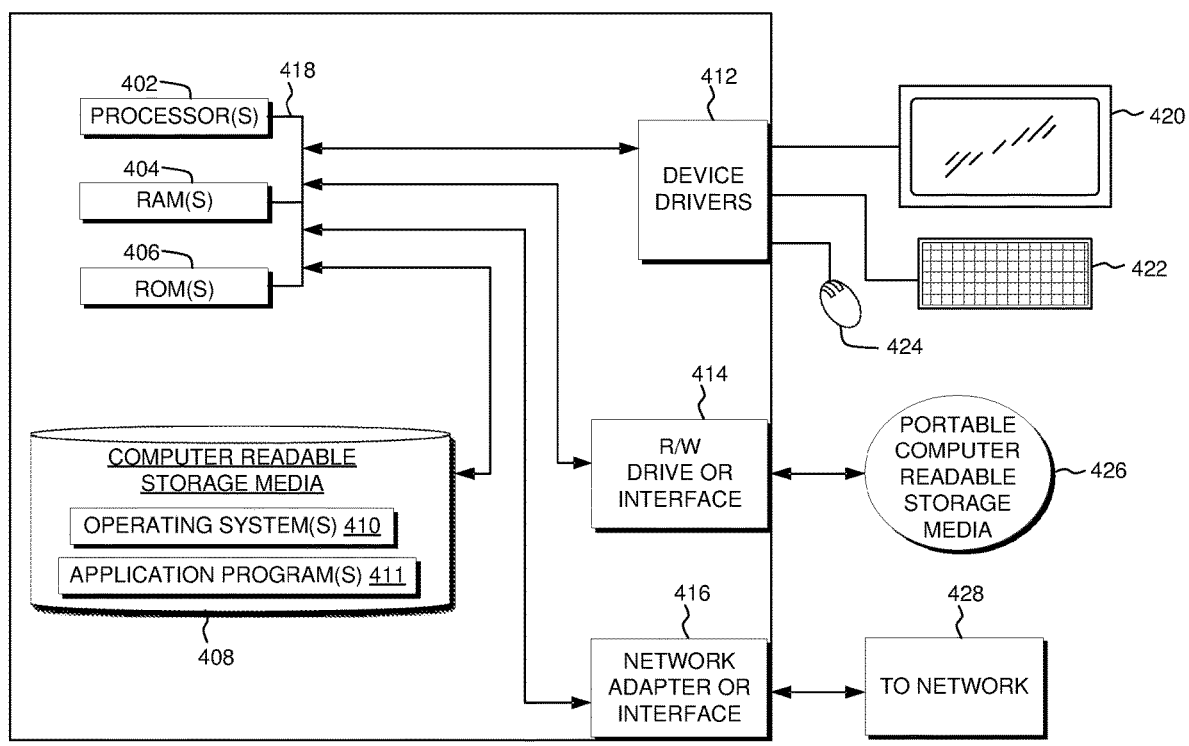
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
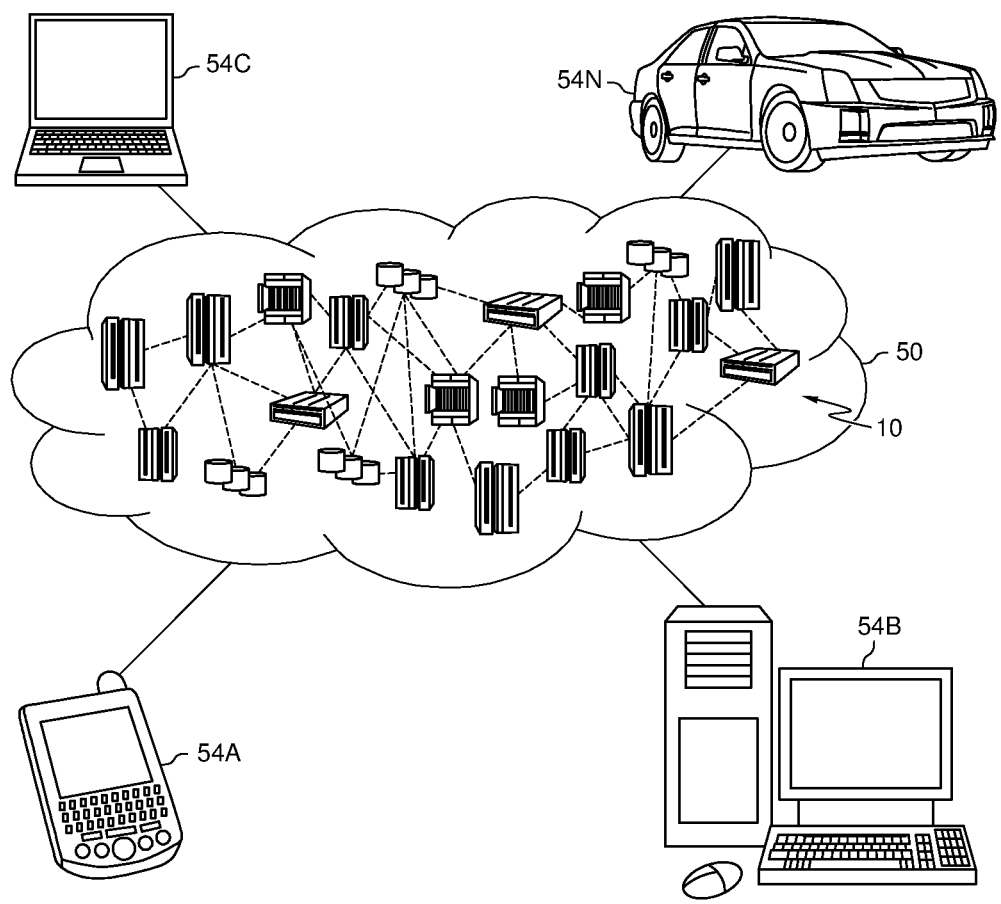
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
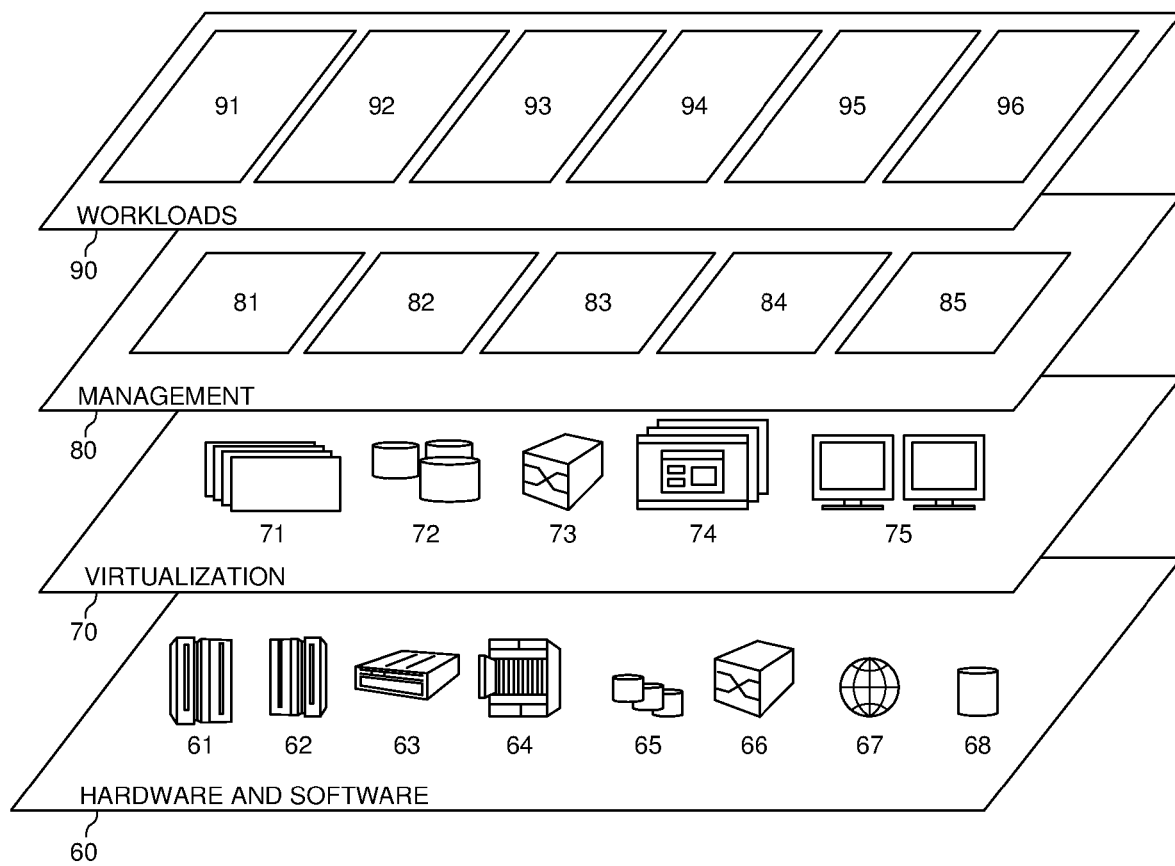
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a taste and smell classifier 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for classifying taste and smell, comprising:
   receiving, by one or more processors, an input from a plurality of users, the input including information regarding at least one of changes in smell and changes in taste perceived by each of the plurality of users, the input being received from the plurality of users in one or more languages;
   using natural language processing, extracting, by the one or more processors, a text comprising one or more words from the input, the text being associated with taste and smell perceptions;
   generating, by the one or more processors, feature vectors for the text extracted from the input using global vectors;
   calculating, by the one or more processors, a distance between the feature vectors and a plurality of reference descriptors associated with taste and smell for determining a similarity between the text extracted from the input and the plurality of reference descriptors and generating a training dataset; and
   generating, by the one or more processors, a classification model based on the training dataset for categorizing the plurality of users according to the at least one of changes in smell and changes in taste.

2. The method of claim 1, wherein the input received from the plurality of users is selected from a group consisting of a text input, a voice input, and a video input.

3. The method of claim 1, further comprising:
   associating, by the one or more processors, the at least one of changes in smell and changes in taste with one or more health conditions.

4. The method of claim 1, wherein the input from the plurality of users is received in response to one or more questions comprising at least one of:
   what changes in smell have you perceived; and
   what changes in taste have you perceived.

5. The method of claim 1, wherein extracting the text from the input is performed using a bag-of-words approach.

6. The method of claim 5, further comprising:
   extending, by the one or more processors, the bag-of-words approach to whole sentences by comparing the one or more words in the text to a set of reference sentences, paragraphs, and multiple paragraphs.

7. The method of claim 1, wherein calculating the distance further comprises:
   calculating, by the one or more processors, a distribution of distances including the one or more words in the text extracted from the input; and
   using, by the one or more processors, a summarizing parameter to establish a relationships between the plurality of users.

8. The method of claim 1, wherein reference descriptors in the plurality of reference descriptors associated with smell are selected from a group consisting of bakery, sweet, fruit, fish, garlic, spices, cold, sour, burnt, acid, warm, musky, sweaty, urine, decayed, wood, grass, flower, and chemical.

9. The method of claim 1, wherein reference descriptors in the plurality of reference descriptors associated with taste are selected from a group consisting of salty, sour, sweet, bitter, and savory.

10. A computer system for classifying taste and smell, comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
    receiving, by the one or more processors, an input from a plurality of users, the input including information regarding at least one of changes in smell and changes in taste perceived by each of the plurality of users, the input being received from the plurality of users in one or more languages;
    using natural language processing, extracting, by the one or more processors, a text comprising one or more words from the input, the text being associated with taste and smell perceptions;
    generating, by the one or more processors, feature vectors for the text extracted from the input using global vectors;

calculating, by the one or more processors, a distance between the feature vectors and a plurality of reference descriptors associated with taste and smell for determining a similarity between the text extracted from the input and the plurality of reference descriptors and generating a training dataset; and generating, by the one or more processors, a classification model based on the training dataset for categorizing the plurality of users according to the at least one of changes in smell and changes in taste.

11. The computer system of claim 10, wherein the input received from the plurality of users is selected from a group consisting of a text input, a voice input, and a video input.

12. The computer system of claim 10, further comprising:
associating, by the one or more processors, the at least one of changes in smell and changes in taste with one or more health conditions.

13. The computer system of claim 10, wherein the input from the plurality of users is received in response to one or more questions comprising at least one of:
what changes in smell have you perceived; and
what changes in taste have you perceived.

14. The computer system of claim 10, wherein extracting the text from the input is performed using a bag-of-words approach.

15. The computer system of claim 14, further comprising:
extending, by the one or more processors, the bag-of-words approach to whole sentences by comparing the one or more words in the text extracted from the input to a set of reference sentences, paragraphs, and multiple paragraphs.

16. The computer system of claim 10, wherein calculating the distance further comprises:
calculating, by the one or more processors, a distribution of distances including the one or more words in the text extracted from the input; and
using, by the one or more processors, a summarizing parameter to establish a relationships between the plurality of users.

17. The computer system of claim 10, wherein reference descriptors in the plurality of reference descriptors associated with smell are selected from a group consisting of bakery, sweet, fruit, fish, garlic, spices, cold, sour, burnt, acid, warm, musky, sweaty, urine, decayed, wood, grass, flower, and chemical.

18. The computer system of claim 10, wherein reference descriptors in the plurality of reference descriptors associated with taste are selected from a group consisting of salty, sour, sweet, bitter, and savory.

19. A computer program product for classifying taste and smell, comprising:
one or more computer readable storage media, and program instructions collectively stored on the one or more computer readable storage media, the program instructions comprising:
program instructions to receive, by one or more processors, an input from a plurality of users, the input including information regarding at least one of changes in smell and changes in taste perceived by each of the plurality of users, the input being received from the plurality of users in one or more languages;
using natural language processing, program instructions to extract, by the one or more processors, a text comprising one or more words from the input, the text being associated with taste and smell perceptions;
program instructions to generate, by the one or more processors, feature vectors for the text extracted from the input using global vectors;
program instructions to calculate, by the one or more processors, a distance between the feature vectors and a plurality of reference descriptors associated with taste and smell for determining a similarity between the text extracted from the input and the plurality of reference descriptors and generating a training dataset; and
program instructions to generate, by the one or more processors, a classification model based on the training dataset for categorizing the plurality of users according to the at least one of changes in smell and changes in taste.

20. The computer program product of claim 19, wherein the input received from the plurality of users is selected from a group consisting of a text input, a voice input, and a video input.

* * * * *